Jan. 12, 1932.  C. P. NELLIS  1,840,634
LAMINATED STEERING WHEEL RIM
Filed April 30, 1928   2 Sheets-Sheet 1

Inventor
Carl P. Nellis
By Spencer Hardman & Fehr
  his Attorneys

Jan. 12, 1932.  C. P. NELLIS  1,840,634
LAMINATED STEERING WHEEL RIM
Filed April 30, 1928   2 Sheets-Sheet 2
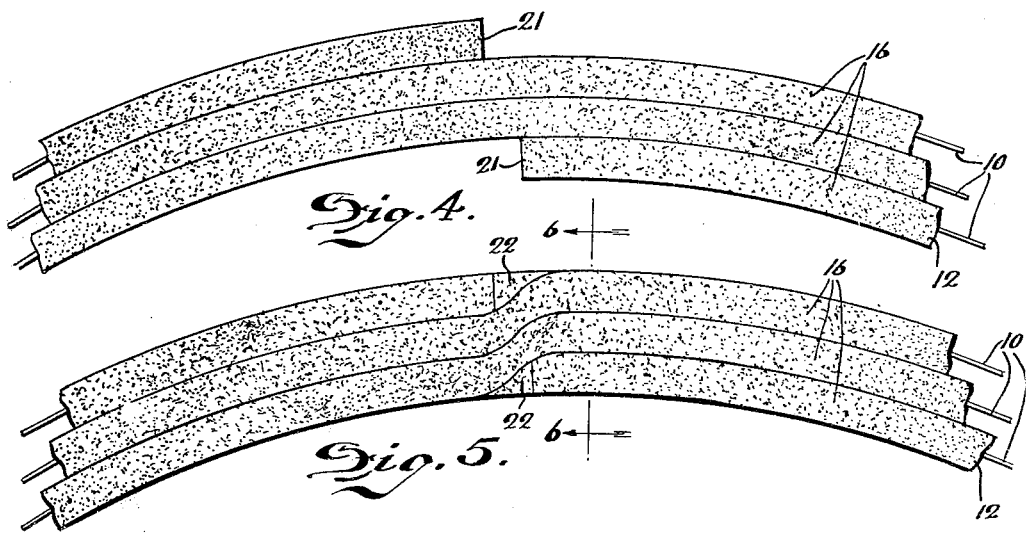
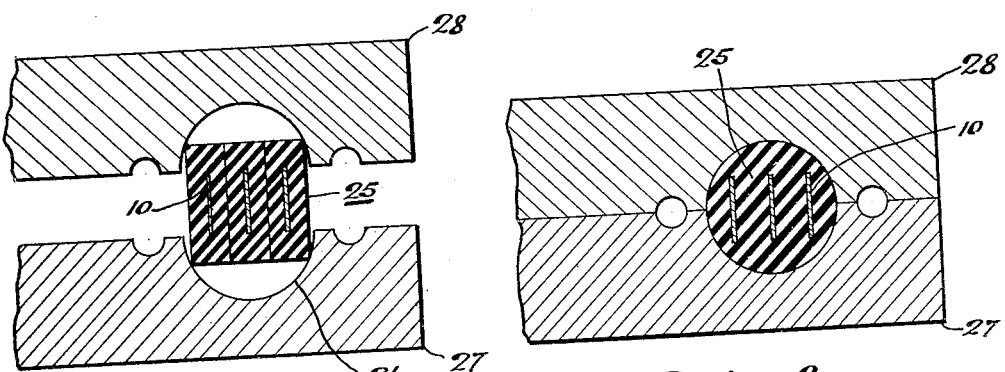
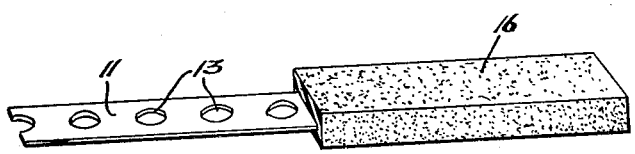
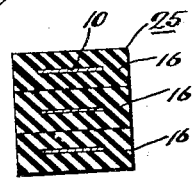

Patented Jan. 12, 1932

1,840,634

UNITED STATES PATENT OFFICE

CARL P. NELLIS, OF DAYTON, OHIO, ASSIGNOR TO THE INLAND MANUFACTURING COMPANY, OF DAYTON, OHIO, A CORPORATION OF DELAWARE

LAMINATED STEERING WHEEL RIM

Application filed April 30, 1928. Serial No. 273,950.

This invention relates to molded rims, especially such as are adapted for steering wheel rims for automotive vehicles, and a method for making same.

An object of this invention is to provide an improved molded rim having a coiled metal ribbon therein to reinforce and greatly increase the strength thereof under shock.

Another object is to provide an improved method of making a metal reinforced molded rim.

Further objects and advantages of the present invention will be apparent from the following description, reference being had to the accompanying drawings, wherein a preferred form of embodiment of the present invention is clearly shown.

In the drawings:

Fig. 2 is a cross section through the rim on line 2—2 of Fig. 1.

Fig. 4 shows a portion of the annulus as it comes from the drum upon which it is coiled, and shows the free ends of the strip out of alignment with the peripheral walls adjacent thereto.

Fig. 5 is similar to Fig. 4, but shows the free ends of the strip pressed in to form a true annulus and extra small pieces of unvulcanized rubber inserted into the triangular gaps at these free ends.

Fig. 6 is a section on line 6—6 of Fig. 5 the unvulcanized annulus.

Fig. 7 shows the rectangular cross section annulus being inserted into a vulcanizing mold having a mold cavity of substantially circular cross section.

Fig. 8 shows how the annulus is changed in cross section by closing the mold thereupon.

Fig. 9 is a perspective view showing on the left side the bare perforated metal ribbon, and on the right side this metal ribbon covered with unvulcanized rubber as it comes from the insulating machine.

Similar reference characters refer to similar parts thruout the several views.

Figure 1:
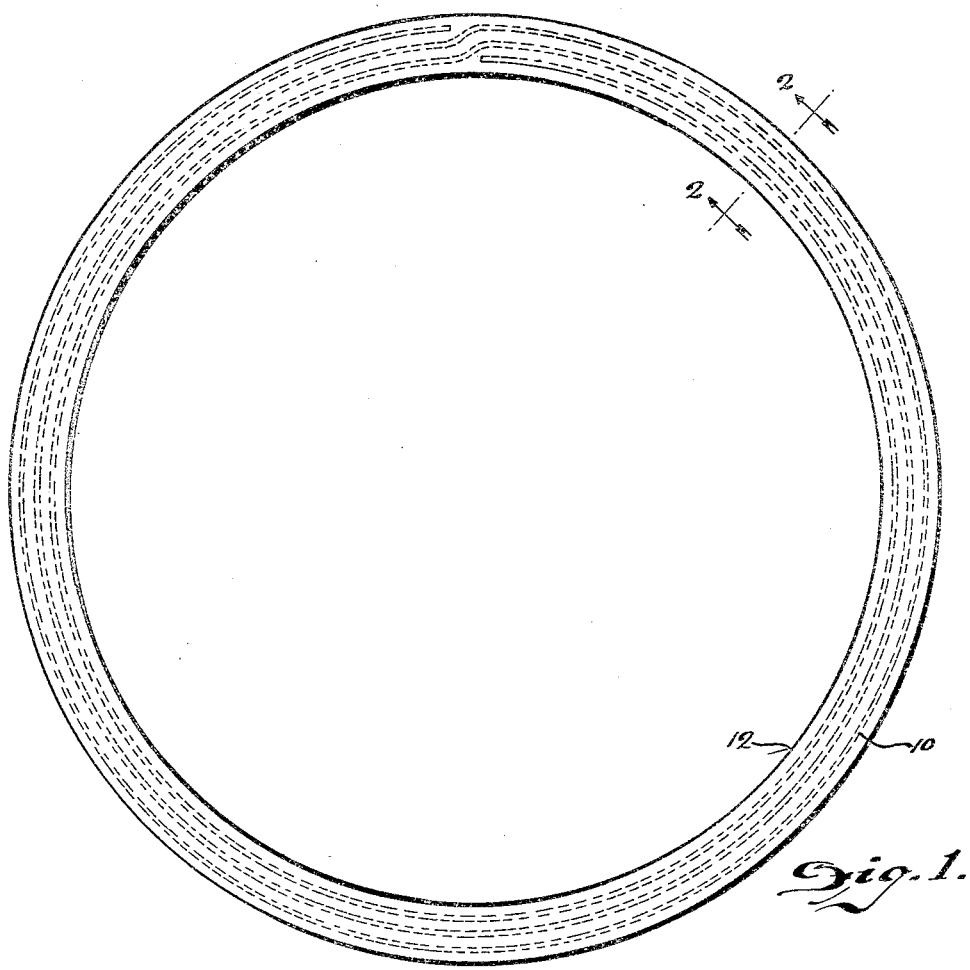
Fig. 1 is a plan view of a finished steering wheel rim made according to the method of this invention.

Referring to the drawings, 10 designates the spiral coil of metal ribbon 11 which is embedded within the rubber material 12 and bonded thereto by vulcanization. (See Figs. 1 and 2.)

Figure 3:
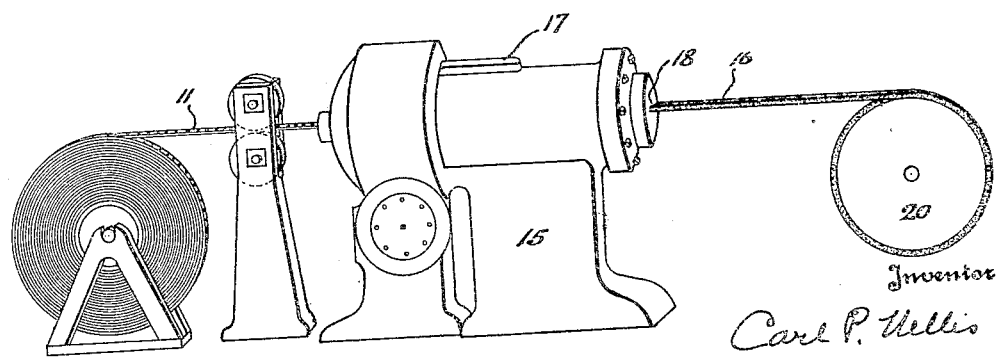
Fig. 3 illustrates certain steps in the method of making the rim, and shows the metal ribbon being covered with unvulcanized rubber by an insulating machine and thereafter being coiled into an annulus.

A clear description of the invention may best be given by first describing the steps in the method of making the annulus. First, a preferably continuous length of metal ribbon 11 having perforations 13 therein is passed thru an extruding machine 15 (see Fig. 3) by which it is coated with a heavy coating of unvulcanized rubber compound forming a substantially rectangular-section flat strip 16. The rubber compound is fed into the machine 15 thru the hopper 17 and is forced by a spiral screw out thru the extruding die 18 of desired dimensions. The metal ribbon 11 is suitably guided to pass out thru the center of die 18 and is thus imbedded in the approximate center of the flat strip 16 of rubber compound. The rubber is firmly anchored to ribbon 11 by being forced into and filling the apertures 13 therein. This flat strip 16 is wound on a drum 20 whose diameter is approximately that of the desired inside diameter of the finished annulus. After several turns of strip 16 (3 turns being illustrated in the drawings) are wound on drum 20, the strip is cut off so that the ends 21 thereof lack a short distance of overlapping, as clearly shown in Fig. 4. This coil of strip 16 (with ends 21 as shown in Fig. 4) is next deformed so that these projecting ends 21 are pressed inwardly to lie substantially flush with the inner and outer peripheries respectively of the coil, thereby forming a more perfect annulus 25, as clearly shown in Fig. 5. Also preferably small pieces 22 of unvulcanized rubber compound are inserted to fill the small wedge-shaped gaps at the ends of the strip 16. This unvulcanized annulus 25 is substantially rectangular in cross section, since the separate strips 16 are plied one upon the other as clearly shown in Figs. 4, 5, and 6.

This plastic and unvulcanized annulus 25 is then set within, or rather partially within, an annular mold cavity 26, having any desired curving cross-section, in the lower half 27 of a suitable vulcanizing mold. The upper half 28 of the mold is then laid upon the annulus 25 (see Fig. 7) and the two halves of the mold are forced together, thereby reshaping the cross section of the plastic annulus 25 to conform with the cross section of the mold cavity 26 (see Fig. 8). The mold is then set within a vulcanizing press and the rubber compound vulcanized to the desired degree of hardness, in a manner well-known in the art, to form the reinforced rubber annulus 12, as shown in Figs. 1 and 2. It is to be noted that the turns of the spiral ribbon 10 are spaced apart by rubber material and form in effect a laminated rim of steel and rubber which will be very strong under shock. If a flexible vibration-absorbing rim is desired for use on a steering wheel on automotive vehicles, the rubber material may be vulcanized to a semi-soft state such as to give a somewhat flexible rim which will be very strong due to the reinforcing metal coil 10.

While the form of embodiment of the present invention as herein disclosed, constitutes a preferred form, it is to be understood that other forms might be adopted, all coming within the scope of the claims which follow.

What is claimed is as follows:

1. As an article of manufacture, a steering wheel rim comprising a molded rubber annulus having a spiral coil of flat metal ribbon imbedded therein with rubber spacing the separate turns of said spiral coil to form a flexible reinforcement therefor.

2. As an article of manufacture, a steering wheel rim comprising a molded rubber annulus having a spiral coil of flat metal ribbon imbedded therein with rubber spacing the separate turns of said spiral coil to form a flexible reinforcement therefor, the separate turns of said spiral coil being spaced apart and the intermediate space being filled with the molded rubber.

3. The steps in the method of making a molded annulus comprising: forming a flat strip of unvulcanized rubber material having a metal ribbon imbedded therein, coiling this metal reinforced flat strip into a spiral to form an annulus having more than one turn of said strip, shaping said annulus thus formed into the desired cross section but leaving the spiral turns of said ribbon substantially aligned, in a transverse direction and then vulcanizing the rubber material in a mold.

4. The steps in the method of making a molded annulus comprising: forming a flat strip of unvulcanized rubber material having a metal ribbon imbedded therein, coiling this metal reinforced flat strip into a spiral to form an annulus having more than one turn of said strip, pressing the annulus thus formed into a mold cavity to shape the rubber material to the desired cross section but leaving the spiral turns of said ribbon substantially aligned, in a transverse direction, and then vulcanizing the rubber to form an integral structure having a spirally coiled metal ribbon therein.

5. The steps in the method of making a molded hard rubber wheel rim comprising: forming a flat strip of unvulcanized rubber material having a metal ribbon imbedded therein, coiling this metal reinforced flat strip into a spiral to form an annulus having more than one turn of said strip and having the free ends of said strip falling slightly short of mutually overlapping, pressing the free ends of the coiled strip toward the center of the cross section of the annulus so that said free ends lie substantially flush with the peripheral walls of said annulus, pressing the annulus thus formed into a mold cavity but leaving the separate turns of said ribbon in substantially the same plane, and then vulcanizing the rubber into an integral structure having a coiled metal ribbon therein.

6. The steps in the method of making a metal reinforced molded hard rubber rim, comprising: extruding unvulcanized rubber about an apertured flat metal ribbon to form a reinforced strip, coiling this strip up into a spiral of several turns to form an annulus, and then vulcanizing said annulus in a mold having a mold cavity of the desired cross section, whereby to form an integral structure having a spiral metal ribbon having a plurality of turns embedded therein.

In testimony whereof I hereto affix my signature.

CARL P. NELLIS.